(12) United States Patent  
Chin et al.

(10) Patent No.: US 7,453,657 B2
(45) Date of Patent: Nov. 18, 2008

(54) COLOR WHEEL

(75) Inventors: Ke-Shu Chin, Junghe (TW); Chih-Neng Chang, Taipei (TW); Kuang-Hua Chang, Junghe (TW); Yin-Tai Keng, Taipei (TW); An-Hwa Yu, Shinjuang (TW)

(73) Assignee: Pordisc Technology Co., Ltd. (TW)

( * ) Notice: Subject to any disclaimer, the term of this patent is extended or adjusted under 35 U.S.C. 154(b) by 1035 days.

(21) Appl. No.: 10/386,464

(22) Filed: Mar. 13, 2003

(65) Prior Publication Data

US 2004/0032540 A1    Feb. 19, 2004

(30) Foreign Application Priority Data

Aug. 19, 2002    (TW)    ............... 91212871 U

(51) Int. Cl.
  *G02B 5/22*    (2006.01)
  *G03B 21/14*    (2006.01)
(52) U.S. Cl. .......................... 359/892; 359/885; 353/84

(58) Field of Classification Search ................. 359/885, 359/889, 891, 892; 348/743; 356/418; 353/31, 353/84

See application file for complete search history.

(56) References Cited

U.S. PATENT DOCUMENTS

| 4,076,393 | A | * | 2/1978 | Bates | .......................... 359/892 |
| 4,107,764 | A | * | 8/1978 | Riley | ............................ 362/35 |
| 6,598,977 | B1 | * | 7/2003 | Chen | ............................ 353/31 |
| 2004/0046945 | A1 | * | 3/2004 | Chang | ........................ 353/84 |
| 2006/0126199 | A1 | * | 6/2006 | Jia | .............................. 359/892 |

* cited by examiner

*Primary Examiner*—Arnel C. Lavarias
*Assistant Examiner*—Jade Callaway
(74) *Attorney, Agent, or Firm*—Roger H. Chu

(57) ABSTRACT

A color wheel including a motor body, a housing, a spacer and a color filter. In this case, the housing is set to a side of the central axis of the motor body. The spacer is placed over the housing. The color filter is set on one side of the spacer, which is opposite the housing, so that there is a recess between the color filter and the housing.

20 Claims, 5 Drawing Sheets

COLOR WHEEL

BACKGROUND OF THE INVENTION

1. Field of the Invention

The invention relates to a color wheel and more particularly, this invention relates to a color wheel, which is used in the projection technology.

2. Description of the Related Art

Digital Light Processing (DLP) is a widely used projection technology. DLP has several advantages over other methods including high brightness, accurate tone reproduction, fast response time, noise-free operation, and thin and light composition.

In a DLP projector, a digital control method and a reflection principle are adopted. Light rays from the light source are collected and focused by the lens to pass through three color filters. Then, the light rays are projected onto a digital micromirror device (DMD). Since the DMD includes several movable micro mirrors, driving electrodes may control the tilt angle and deflection time of each movable mirror. Then, the light rays are projected to form an image by switching the direction of the light ray reflections.

In the DLP projector, a color wheel 2 for generating the light rays of several colors is generally provided. Referring to FIG. 1, the color wheel 2 mainly includes a washer 21, a color filter 22 and a motor 23. The washer 21 and the color filter 22 are mounted on the motor 23. In this case, the motor 23 includes a housing 231 and a motor body 232, which rotates together with the housing 231.

In addition, the color wheel is also used in Liquid Crystal on Silicon (LCOS) projectors and Liquid Crystal Display (LCD) projectors. Herein, the function of the color wheel is the same as in DLP projectors for separating the light rays into several colors.

In general, the motor for the color wheel rotates at a speed higher than 7200 rpm. When the rotation center of the motor is away from the central axis of the rotation shaft (i.e., when the rotation center is not located on the central axis of the rotation shaft), the operation of the color wheel may be adversely influenced by vibration and noise. Further, the operational reliability of the color wheel may decrease.

It is therefore an important objective of the invention to provide a color wheel to solve the problem mentioned above.

SUMMARY OF THE INVENTION

An objective of the invention is to provide a color wheel, which may have the advantage of correcting the rotation center.

To achieve the above-mentioned objective, the invention provides a color wheel including a motor body, a housing, a spacer and a color filter. In this case, the housing is set to one side of the central axis of the motor body. The spacer is placed over the housing. The color filter is set on one side of the spacer opposite the housing, so that there is a recess between the color filter and the housing.

As mentioned above, the invention provides a color wheel, in which an added counterpoise is positioned within a specific recess formed by the spacer, so that the position of the rotation center may be corrected. Compared to the prior art, the difficulty of positioning in this invention may be decreased by fitting or adhering the counterpoise into the specific recess of the color wheel. Furthermore, since the counterpoise may be placed totally within the recess, it is free from collisions. Also, the influence on the counterpoise caused by centrifugal force is reduced. Moreover, since the rotation center of the color wheel may be corrected, the vibration and noise caused by the color wheel is further reduced, and the operational reliability is also improved. In addition, since the spacer is the transparent substance and it can be irradiated by light, the binding time of the color filter, the spacer and the housing is further reduced, and the fabrication cost is also reduced. Besides, a specific groove is formed in the spacer, and the groove may absorb an excess of adhesive between the color filter and the spacer. In other words, an excess of adhesive may flow into the groove, so that the pollution of the color filter caused by the adhesive is avoided. Then, the definition and the clear scope of the color filter are improved.

BRIEF DESCRIPTION OF THE DRAWINGS

The invention will become more fully understood from the detailed description given in the herein below illustration, and thus are not limitative of the present invention, and wherein.

DETAILED DESCRIPTION OF THE INVENTION

The color wheel in accordance with preferred embodiments of the invention will be described with reference to the accompanying drawings.

Figure 1:
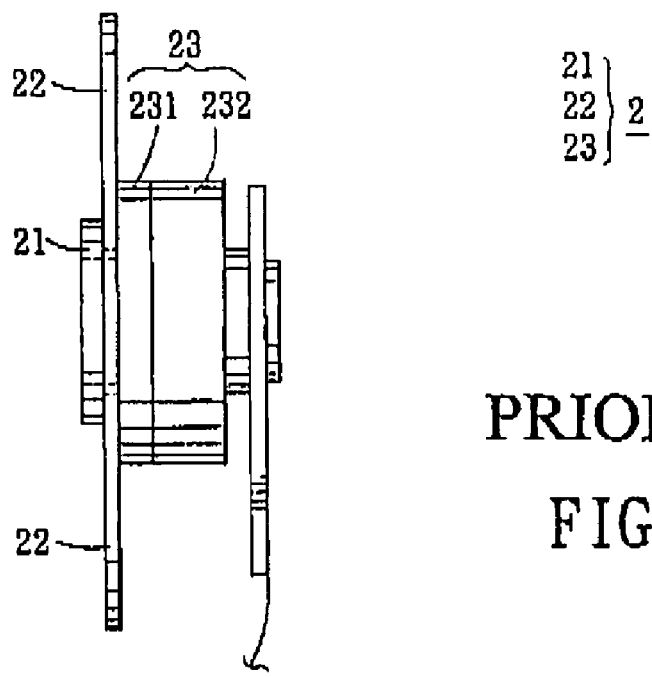
FIG. 1 is a schematic illustration that shows a side view of a conventional color wheel.
Figure 2:
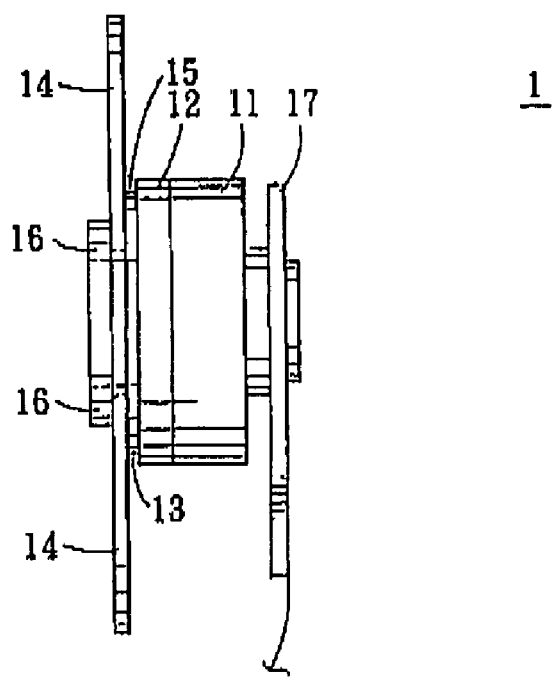
FIG. 2 is a schematic illustration that shows a side view of the color wheel in accordance with an embodiment of the invention.

Referring to FIG. 2, a color wheel 1 provided by an embodiment of the invention includes a motor body 11, a housing 12, a spacer 13, and a color filter 14. The housing 12 is set to one side of the central axis of the motor body 11. The spacer 13 is placed over the housing 12. The color filter 14 is set on one side of the spacer 13, which is opposite the housing 12, so that there is a recess 15 between the color filter 14 and the housing 12.

In this embodiment, the motor body 11 mainly includes a shell, a magnetic ring (not shown), laminated steel stack (not shown) and a coil (not shown). When the coil is turned on, the laminated steel stack produces a magnetic force and a magnetic field. The positive or negative properties as well as the intensity of the current may cause the magnetic field to vary in an ordered manner. That is, a rotary magnetic field will cooperate with the magnetic ring, which will rotate accordingly.

Figure 3A:
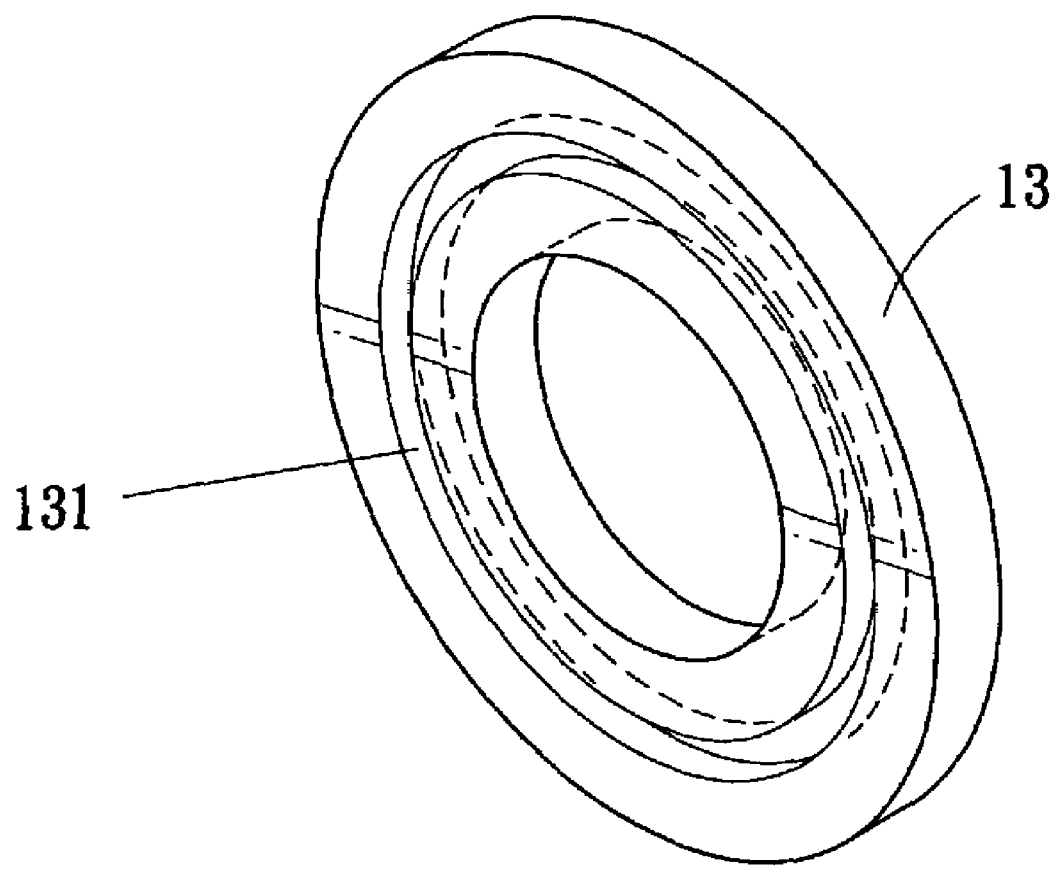
FIG. 3A to FIG. 3C are schematic illustrations that show pictorial views of others spacers in accordance with an embodiment of the invention.
Figure 3B:
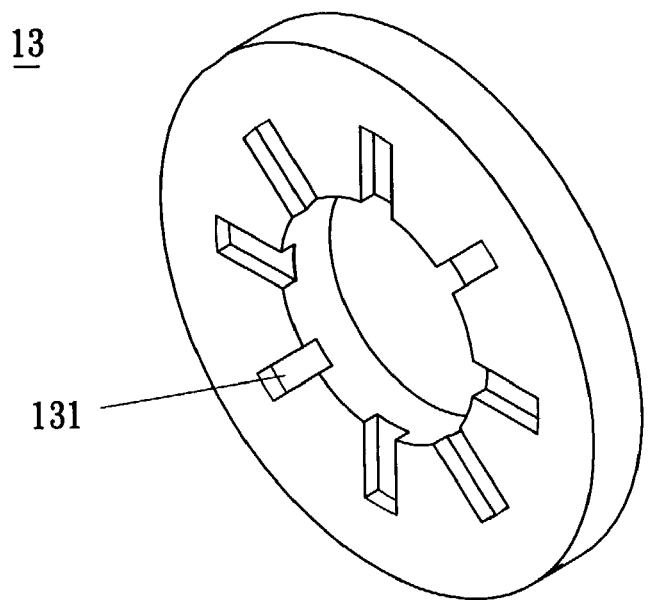
Figure 3C:
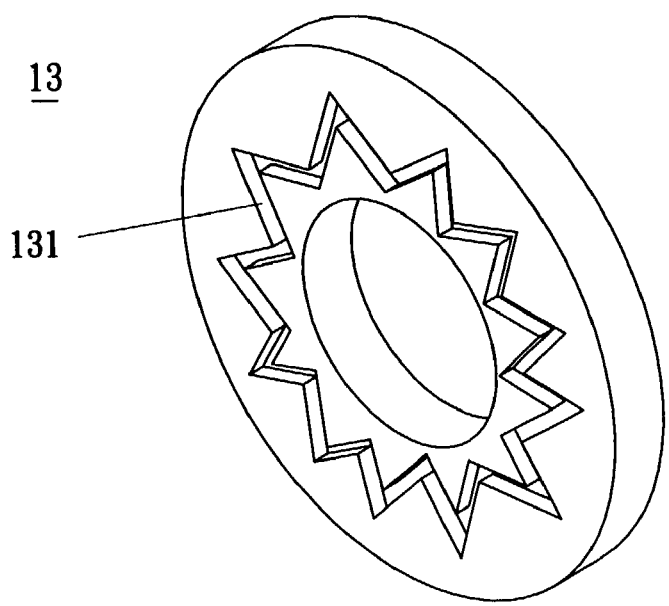

As shown in FIG. 2, the spacer 13 is placed over the housing 12. In the current embodiment, at least one groove 131 is formed on one side of the spacer 13, the side of the spacer 13 adjoining the color filter 14. Herein, the groove 131 is a ring-shaped groove (show in FIG. 3A), a radial groove (show in FIG. 3B) or an irregular groove (show in FIG. 3C). The number of the grooves is two or more.

Additionally, in this embodiment, the spacer 13 is a transparent substance and the spacer 13 could be made of glass or a transparent polymer such as acrylate. Moreover, the spacer 13 may be a ring-shaped spacer or a substantially ring-shaped spacer.

Referring again to FIG. 2, the color filter 14 is set on one side of the spacer 13, which is opposite to the housing 12, so that there is a recess 15 between the color filter 14 and the housing 12. In this case, the color filter 14 is set on the spacer 13 by way of, for example, an adhering process. In the current embodiment, the color filter 14 is a circular filter or a ring-shape filter composed of three or more filter sectors of red, green and blue. The color filter 14 may also be a circular filter or a ring-shaped filter composed of one transparent block and three or more filter sectors of red, green and blue.

Figure 4:
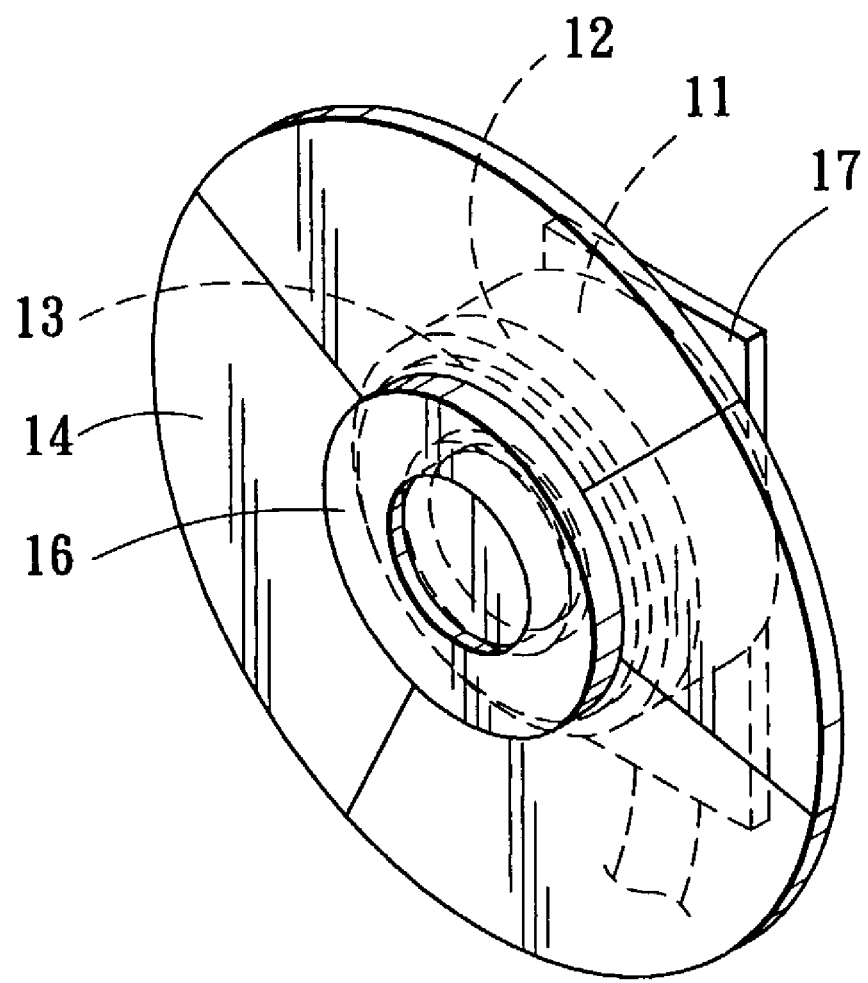
FIG. 4 is a pictorial view of FIG. 2.
Figure 5:
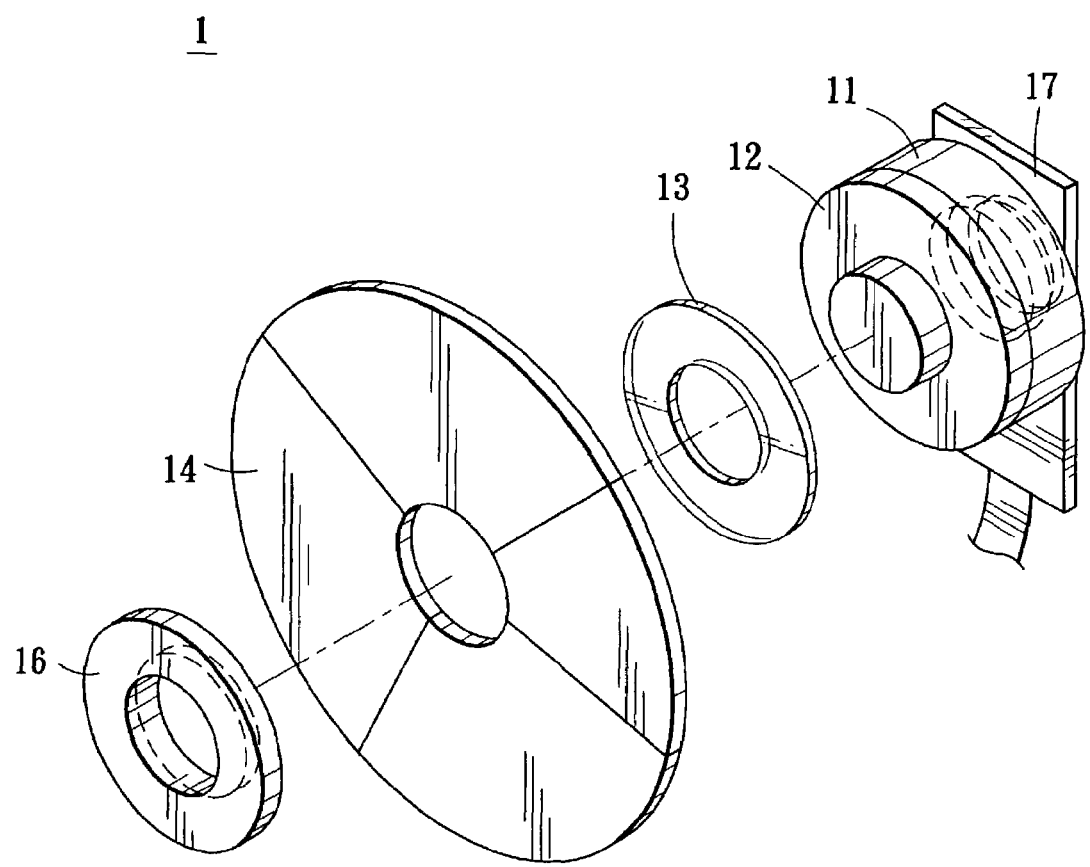
FIG. 5 is a partially pictorial and exploded view of FIG. 4.

FIG. 4 is a pictorial view of FIG. 2, and FIG. 5 is a partially pictorial and exploded view of FIG. 4.

Referring to FIG. 4 and FIG. 5, the color wheel 1 of this embodiment further includes a washer 16, which is set on the color filter 14 by way of, for example, a fitting or adhering process. In this case, the washer 16 is used to enlarge the contact area between the color filter 14, the spacer 13 and the housing 12.

Referring again to FIG. 4 and FIG. 5, the color wheel 1 of this embodiment further includes a positioning plate 17 on which the motor body 11 is pivotally mounted. The positioning plate 17 is connected to an actuator (not shown) via wires (not shown). The actuator drives the motor body 11 to rotate about a central axis corresponding to the pivotal point between the positioning plate 17 and the motor body 11.

After the color wheel 1 rotates for a period of time, the rotation center of the color wheel may be offset from the central axis (not shown) due to prolonged usage. Therefore, when the rotation center is not positioned on the central axis, vibration and noise may result and the operational reliability may be adversely affected.

In this embodiment, a counterpoise, which may be any block or counterbalance having a predetermined weight, is used to correct the rotation center. The correction method is performed by fitting or engaging the counterpoise to the recess 15, which is between the housing 12 and the color filter 14, and using a machine to adjust the position of the counterpoise in the recess 15 according to the degree of displacement of the rotation center. The counterpoise may also be adhered to the recess 15.

Also, in this embodiment, the color filter 14 is set on the spacer 13 by adhering. When too much adhesive is applied to the color filter 14 and the spacer 13, or the relative position of the color filter 14 and the spacer 13 is moved, the adhesive may overflow and pollute the color filter 14. Furthermore, the definition and the clear scope of the color filter 14 may be decreased. In the current embodiment, an excess of adhesive may flow into the groove 131, so that the pollution of the color filter 14 caused by adhesive is avoided.

Furthermore, because the spacer 13 is a transparent substance, it can implement the irradiation process when binding the color filter 14, the spacer 13 and the housing 12. In this case, an ultraviolet (UV) light binder may be used to bind the color filter 14, the spacer 13 and the housing 12.

In the color wheel of this invention, the rotation center may be corrected by adding a counterpoise to a specific recess. Compared to the prior art, the difficulty of positioning in this invention may be decreased by fitting or adhering the counterpoise into the specific recess of the motor. Furthermore, since the counterpoise may be placed totally within the recess, it is free from collisions. Also, the influence on the counterpoise caused by centrifugal force is reduced. Moreover, since the rotation center of the color wheel may be corrected, the vibration and noise caused by the color wheel are further reduced, and the operational reliability is also improved. In addition, since the spacer is the transparent substance and it can be irradiated by light, the binding time of the color filter, the spacer and the housing is further reduced, and the fabrication cost is also reduced. Besides, a specific groove is formed in the spacer, and the groove may absorb an excess of adhesive between the color filter and the spacer. In other words, an excess of adhesive may flow into the groove, so that the pollution of the color filter caused by the adhesive is avoided. Then, the definition and the clear scope of the color filter are improved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A color wheel, comprising:
   a motor body;
   a housing set to a side of a central axis of the motor body;
   a spacer placed over the housing; and
   a color filter set on a side of the spacer, the side of the spacer being opposite to the housing, wherein a recess is formed between the color filter and the housing, and an added counterpoise is positioned within the recess so that the position of the rotation center is corrected.

2. The color wheel according to claim 1, wherein at least a groove is formed on a side of the spacer, the side of the spacer adjoining the color filter.

3. The color wheel according to claim 2, wherein the groove of the spacer is a ring-shaped groove.

4. The color wheel according to claim 2, wherein the groove of the spacer is a radial groove.

5. The color wheel according to claim 2, wherein the groove of the spacer is an irregular groove.

6. The color wheel according to claim 2, wherein the housing has two or more grooves.

7. A color wheel, comprising:
   a motor body;
   a housing set to a side of a central axis of the motor body;
   a spacer placed over the housing; and
   a color filter set on a side of the spacer, the side of the spacer being opposite to the housing, wherein a recess is formed between the color filter and the housing, the spacer is a transparent body, and an added counterpoise is positioned within the recess so that the position of the rotation center is corrected.

8. The color wheel according to claim 7, wherein the spacer is made of glass.

9. The color wheel according to claim 7, wherein the spacer is made of acrylate.

10. The color wheel according to claim 1, wherein the spacer is a ring-shaped spacer.

11. The color wheel according to claim 1, further comprising:
    a washer set on the color filter.

12. The color wheel according to claim 1, further comprising:
    a positioning plate on which the motor body is pivotally mounted.

13. The color wheel according to claim 7, wherein at least a groove is formed on a side of the spacer, the side of the spacer adjoining the color filter.

14. The color wheel according to claim 13, wherein the groove of the spacer is a ring-shaped groove.

15. The color wheel according to claim 13, wherein the groove of the spacer is a radial groove.

16. The color wheel according to claim 13, wherein the groove of the spacer is an irregular groove.

17. The color wheel according to claim 8, wherein at least a groove is formed on a side of the spacer, the side of the spacer adjoining the color filter.

18. The color wheel according to claim 17, wherein the groove of the spacer is a ring-shaped groove.

19. The color wheel according to claim 17, wherein the groove of the spacer is a radial groove.

20. The color wheel according to claim 17, wherein the groove of the spacer is an irregular groove.

* * * * *